United States Patent
Takemoto

(10) Patent No.: US 11,842,519 B2
(45) Date of Patent: Dec. 12, 2023

(54) IMAGE PROCESSING APPARATUS FOR PROCESSING CAPTURED IMAGE, METHOD THEREFOR, AND STORAGE MEDIUM

(71) Applicant: CANON KABUSHIKI KAISHA, Tokyo (JP)

(72) Inventor: Kazuki Takemoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 17/575,029

(22) Filed: Jan. 13, 2022

(65) Prior Publication Data

US 2022/0230358 A1 Jul. 21, 2022

(30) Foreign Application Priority Data

Jan. 19, 2021 (JP) .................... 2021-006596

(51) Int. Cl.
*G06K 9/00* (2022.01)
*G06T 7/90* (2017.01)
(Continued)

(52) U.S. Cl.
CPC .............. *G06T 7/90* (2017.01); *G06T 7/174* (2017.01); *G06V 10/28* (2022.01); *G06V 20/64* (2022.01)

(58) Field of Classification Search
CPC .......... G06T 2207/30201; G06T 11/00; G06T 2200/24; G06T 5/005; G06T 7/11; G06T 7/73; G06T 7/90; G06T 11/60; G06T 2207/10004; G06T 2207/10016; G06T 2207/20021; G06T 2207/30168; G06T 7/10; G06T 7/12; G06T 11/40; G06T 2207/10024; G06T 5/002; G06T 7/0012; G06T 7/187; G06T 7/194; G06T 1/0021; G06T 2207/10056; G06T 2207/20012; G06T 2207/20104; G06T 2207/20156; G06T 2207/20224; G06T 2207/30024; G06T 2207/30196; G06T 2207/30244;
(Continued)

(56) References Cited

U.S. PATENT DOCUMENTS

2012/0114254 A1* 5/2012 Nakjima .............. G06T 1/0021
382/201
2015/0228090 A1* 8/2015 Okawa ................. H04N 1/6027
345/604

FOREIGN PATENT DOCUMENTS

JP 2005107967 A 4/2005
JP 2005228140 A 8/2005
(Continued)

*Primary Examiner* — Alex Kok S Liew
(74) *Attorney, Agent, or Firm* — Canon U.S.A., Inc. IP Division

(57) ABSTRACT

An image processing apparatus includes an acquisition unit configured to acquire color information about an object and color information about a background in a first image captured by an image capturing apparatus, a storage unit configured to store the acquired color information about the object and the acquired color information about the background, an expansion unit configured to expand, in a three-dimensional color space, the color information about the object and the color information about the background stored in the storage unit, and an extraction unit configured to extract an area of the object from a second image captured by the image capturing apparatus, based on the respective pieces of the color information expanded by the expansion unit.

13 Claims, 15 Drawing Sheets

(51) Int. Cl.
*G06V 10/28* (2022.01)
*G06V 20/64* (2022.01)
*G06T 7/174* (2017.01)

(58) Field of Classification Search
CPC ....... G06T 7/0002; G06T 7/174; G06T 7/181;
G06T 7/75; G06T 7/97; G06T 11/001;
G06T 2207/20064; G06T 2207/20076;
G06T 2207/20081; G06T 2207/20084;
G06T 2207/30088; G06T 2207/30232;
G06T 2207/30256; G06T 3/0018; G06T
3/0062; G06T 3/4007; G06T 5/006; G06T
7/143; G06T 7/168; G06T 7/215; G06T
7/248; G06T 7/251; G06T 7/277; G06T
7/337; G06T 7/50; G06T 7/77
See application file for complete search history.

(56) References Cited

FOREIGN PATENT DOCUMENTS

| JP | 2011018359 A | 1/2011 |
| JP | 2015230695 A | 12/2015 |

\* cited by examiner

FIG.4

| Y | Cb | Cr | ATTRIBUTE | EXPANSION |
|---|---|---|---|---|
| 0 | 0 | 0 | NONE | 0 |
| 0 | 0 | 1 | UNREGISTERED COLOR | 0 |
| ... | ... | ... | ... | ... |
| 52 | 4 | 33 | UNREGISTERED COLOR | 1 |
| 52 | 4 | 34 | REGISTERED COLOR | 0 |
| 52 | 4 | 35 | REGISTERED COLOR | 1 |
| ... | ... | ... | ... | ... |
| 254 | 254 | 254 | NONE | 0 |

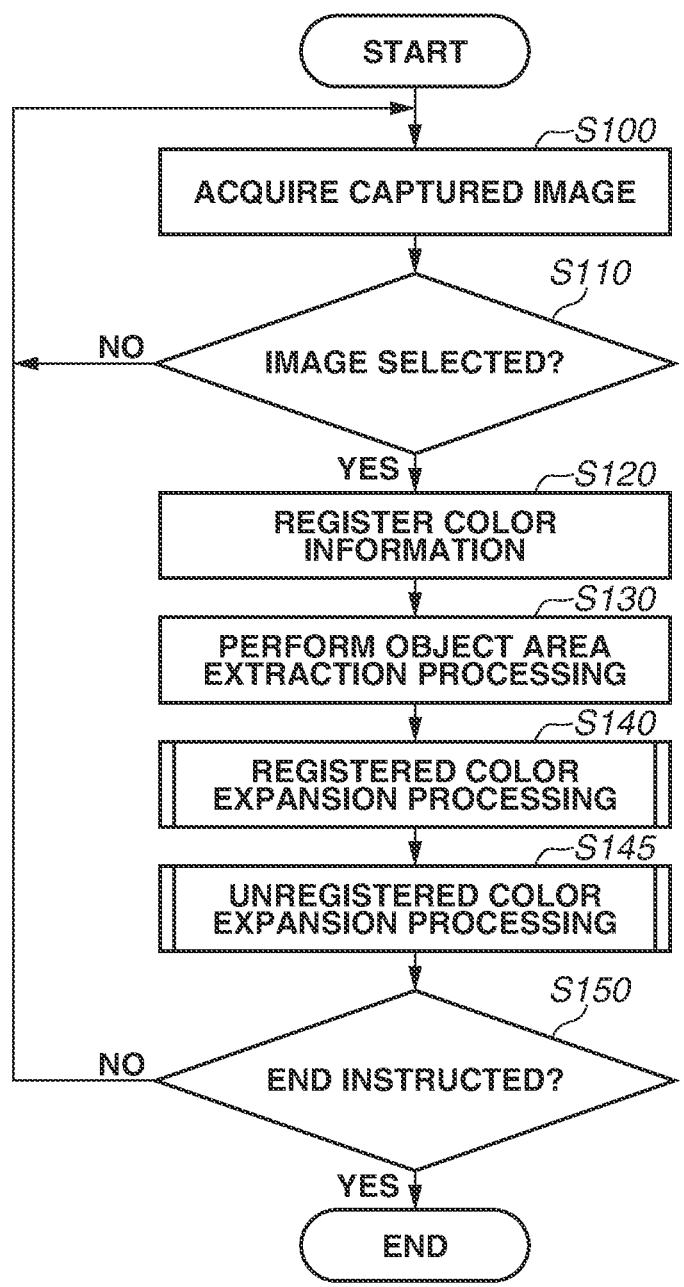

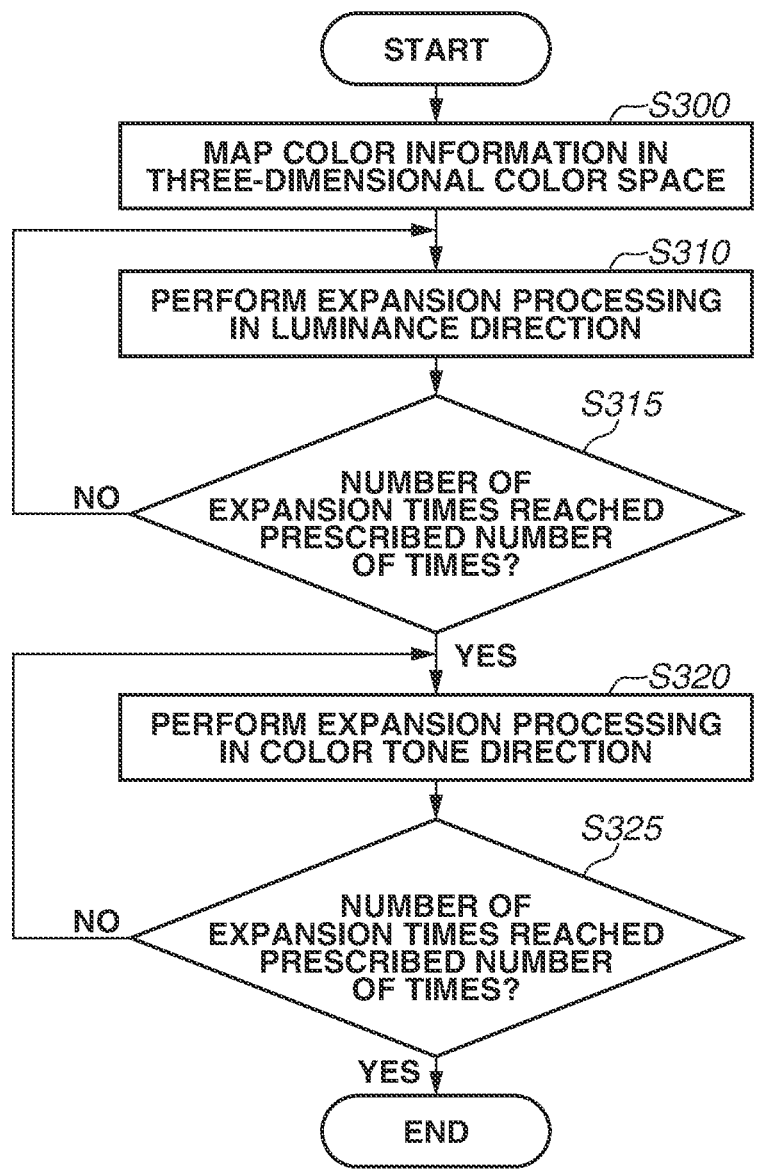

FIG.11

| ATTRIBUTE VALUE OF ADJACENT COLOR | ATTRIBUTE VALUE OF COLOR OF INTEREST |
|---|---|
| ALL "NONE" | NONE |
| ALL "REGISTERED COLOR" | REGISTERED COLOR |
| ALL "UNREGISTERED COLOR" | UNREGISTERED COLOR |
| ONE OR MORE "REGISTERED COLOR" OTHERS "NONE" | REGISTERED COLOR |
| ONE OR MORE "UNREGISTERED COLOR" OTHERS "NONE" | UNREGISTERED COLOR |
| ONE OR MORE "REGISTERED COLOR" AND ONE OR MORE "UNREGISTERED COLOR" | NONE |
| ONE OR MORE "REGISTERED COLOR" AND ONE OR MORE "UNREGISTERED COLOR" OTHERS "NONE" | NONE |

IMAGE PROCESSING APPARATUS FOR PROCESSING CAPTURED IMAGE, METHOD THEREFOR, AND STORAGE MEDIUM

BACKGROUND

Field of the Disclosure

The present disclosure relates to a technique for processing a captured image.

Description of the Related Art

Mixed reality has been being studied that presents, to a user, information about a virtual space with the information about the virtual space superimposed on a real space in a real time. An information processing apparatus that realizes the mixed reality generates a virtual space image corresponding to a position and orientation of an image capturing apparatus by computer graphics (CG), and generates a composite image in which a whole or a part of a real space image captured by the image capturing apparatus is superimposed on the CG virtual space image to display the result. To provide an experience with rich realistic sensations to the user through the mixed reality, such an interaction that enables the user to virtually operate a virtual object drawn by the CG is important in addition to simple superimposed display of the CG image on a background real space image. To realize such interaction, it is necessary to display, for example, a hand of the user operating the virtual object (hereinafter, referred to as object) on a front side (foreground side) of the virtual object. This is because if the object that should exist on the front side of the virtual object is hidden by the virtual object, a sense of distance from the virtual object and reality are collapsed, and the realistic sensations are impaired.

To address this, Japanese Patent Application Laid-Open No. 2005-107967 discusses a technique for preventing the object image to be displayed as a foreground from being hidden by the CG image. This technique realizes separation and extraction of an object area from a background in a camera image, and prohibition of drawing of the CG image in the object area.

To separate the object, color information about the object is previously registered, and the object and the background are distinguished based on the colors of the camera image.

Japanese Patent Application Laid-Open No. 2005-228140 discusses a user interface that supports, with simple operation, registration of the object area and deletion of an erroneously-detected area (referred to as noise area) that is not the object area but is erroneously detected as the object area.

In addition to a method of locating the object area by extracting the previously-registered colors, there is a method of extracting the object area to be the foreground by setting a threshold of a depth value for a depth image obtained by a depth sensor. In this method, however, it is necessary to arrange the depth sensor in addition to the camera and to capture images by the camera and the depth sensor at the same time. Thus, the method has disadvantages in terms of device cost, a labor for sensor calibration, and the like.

Japanese Patent Application Laid-Open No. 2015-230695 discusses processing for providing a user interface enabling simultaneous designation of the "object area" and the "noise (background) area" discussed in Japanese Patent Application Laid-Open No. 2005-228140, and extracts the object area in a short time.

In addition, Japanese Patent Application Laid-Open No. 2011-018359 discusses a method of holding color information about an object and color information about a background as a color information table, and automatically distinguishing an area where the color information about the object and the color information about the background are overlapped.

By the method discussed in Japanese Patent Application Laid-Open No. 2005-107967, however, in a case where the color of the object and the color of the background are close to each other or in a case where a white area or a black area (area of color close to achromatic color) is present in the background, an area that is the background area but is extracted as the object area (erroneously-detected area) may remain. Further, an area that is the object area but is not extracted as the object area (undetected area) may remain. In such cases, the user can eliminate the erroneously-detected area and the undetected area by using the user interface discussed in Japanese Patent Application Laid-Open No. 2005-228140. However, when the user registers the color information until the undetected area of the object is eliminated, the erroneously-detected area may be generated on the background. In contrast, when the user tries to reduce the erroneously-detected area on the background, the undetected area on the object may be increased. Thus, it is necessary to repeatedly adjust the color information to minimize the erroneously-detected area and the undetected area by trial and error, and it takes a time for the adjustment.

In Japanese Patent Application Laid-Open No. 2015-230695, it is possible to extract the object in a shorter time by providing the user interface enabling simultaneous input of the color information about the object and the color information about the background. The technique discussed in Japanese Patent Application Laid-Open No. 2015-230695, however, is to achieve acceleration by eliminating the adjustment operation by the user. Therefore, the adjustment by the user when noise occurs is not allowed.

SUMMARY

The present disclosure is directed to acquisition of color information that enables extraction with high accuracy of a specific object area from a captured image, with less burden on a user in a short time.

According to an aspect of the present disclosure, an image processing apparatus includes an acquisition unit configured to acquire color information about an object and color information about a background in a first image captured by an image capturing apparatus, a storage unit configured to store the acquired color information about the object and the acquired color information about the background, an expansion unit configured to expand, in a three-dimensional color space, the color information about the object and the color information about the background stored in the storage unit, and an extraction unit configured to extract an area of the object from a second image captured by the image capturing apparatus, based on the respective pieces of the color information expanded by the expansion unit.

Further features of the present disclosure will become apparent from the following description of exemplary embodiments with reference to the attached drawings.

BRIEF DESCRIPTION OF THE DRAWINGS

FIG. 4 is a diagram illustrating a configuration example of a color information table.

FIG. 6 is a flowchart of color information registration and expansion processing.

FIG. 8 is a flowchart illustrating details of the expansion processing.

FIG. 11 is a diagram illustrating a condition for determining an attribute after expansion in the expansion processing.

DESCRIPTION OF THE EMBODIMENTS

Figure 1:
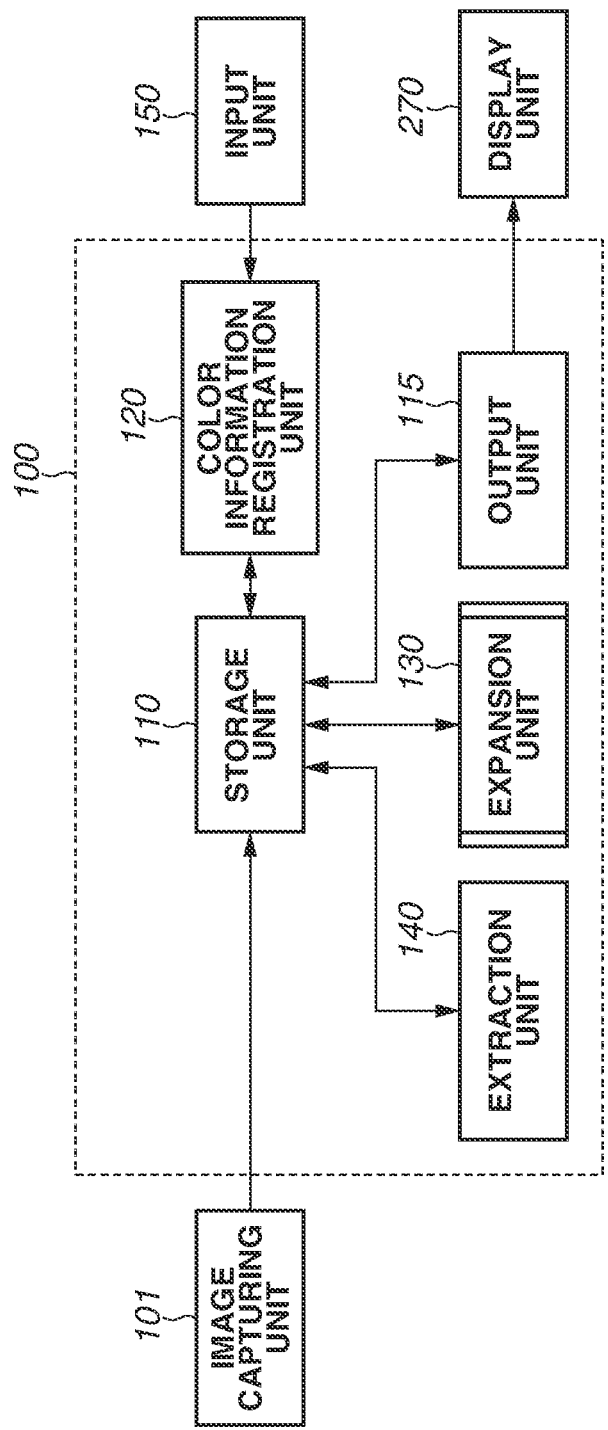
FIG. 1 is a diagram illustrating a configuration example of an image processing apparatus according to one or more aspects of the present disclosure.

Exemplary embodiments will be described in detail below with reference to accompanying drawings. Configurations described in the following exemplary embodiments are merely examples, and the present disclosure is not limited to the illustrated configurations. Similar components or similar processing will be denoted by the same reference numerals and described.

A first exemplary embodiment of the present disclosure will be described below. In the present exemplary embodiment, a case where information about a virtual space is superimposed on a real space in real time to provide mixed reality to a user will be described as an example. Thus, an image processing apparatus according to the present exemplary embodiment includes a mixed reality generation processing function of generating a virtual space image corresponding to a position and orientation of an image capturing apparatus by computer graphics (CG), and generating a composite image in which a whole or a part of a real space image captured by the image capturing apparatus is superimposed on the CG virtual space image. The image processing apparatus according to the present exemplary embodiment also includes a function of realizing interaction that enables the user to virtually operate a virtual object drawn by the CG, in addition to superimposed display of the CG image on a real space image serving as a background. A processing technique for generating the composite image by superimposing the real space image on the CG virtual space image is an existing technique. Thus, illustration and detailed description of a configuration of the processing technique are omitted.

FIG. 1 is a block diagram illustrating a configuration example of an image processing apparatus 100 according to the present exemplary embodiment.

As illustrated in FIG. 1, an image capturing unit 101, an input unit 150, and a display unit 270 are connected to the image processing apparatus 100.

The image capturing unit 101 is a video camera that can capture a color image, and acquires an image including an object by capturing an image of the object, etc. For example, in a case where an example of application to a video see-through head-mounted display is assumed, the image capturing unit 101 is a stereo camera that can acquire stereo images corresponding to visual fields of both the right and left eyes of a user. In the case of the stereo camera, images to be processed are two images captured by right and left cameras, and the images are sequentially processed one by one in a time-divisional manner. The image capturing unit 101, however, is not limited to the stereo camera, and the present exemplary embodiment is applicable to a monocular camera.

The input unit 150 includes an operation device which is used by the user to input operation for instruction, etc. to the image processing apparatus 100. In the present exemplary embodiment, a mouse is used as an example of the operation device. Although detail is described below, the input unit 150 is operated by the user, for example, to designate color information for an object and a background, and to adjust object extraction processing, in the present exemplary embodiment.

The display unit 270 includes a display device displaying an image that is viewed by the user. In the present exemplary embodiment, the display device is, for example, a head-mounted display. The display device of the display unit 270 may be a stationary large monitor. To provide the mixed reality, the display unit 270 displays a composite image in which a real image including the extracted object and a CG image are combined, and performs feedback to the user, thus realizing the interaction which enables, for example, the user to virtually operate the virtual object drawn by CG. Although detail is described below, the display unit 270 displays a user interface image, for example, when the user designates, through the input unit 150, an area that may become a noise in an object area or in a background area other than the object area in the image captured by the image capturing unit 101. In other words, the user can designate the area that may become a noise in the object area or the background area other than the object area, through the input unit 150 while viewing a result displayed on the display unit 270.

Before details of an internal configuration of the image processing apparatus 100 according to the present exemplary embodiment are described, points to be considered in order to realize the mixed reality and the interaction will be described with reference to FIGS. 2A to 2J and FIGS. 3A and 3B. To simplify the description, a case where the captured image input from the image capturing unit 101 is a still image will be described as an example. In the following description, a case where an object area is separated from a background and is extracted from the captured image, and drawing of a CG image on the object area is prohibited will be described as an example. In the following description, as a method to separate the object area, a description will be provided as an example a method in which color information about the object is previously registered and the object area and the background are distinguished based on colors of the captured image.

Figure 2A:
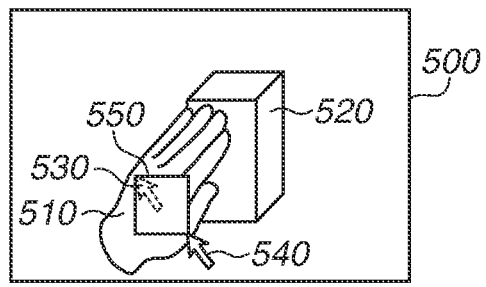
FIGS. 2A to 2J are diagrams used for description of an undetected area and an erroneously-detected area.

FIG. 2A is a diagram illustrating an example in a case where a color of an object in the captured image is registered, and is a diagram schematically illustrating a state where a color of a hand 510 that is an object example in the image is to be registered. In addition to the hand 510, which is the object, a box 520 of a color (e.g., yellow) close to a color of the hand 510 is also included in a video image 500 displaying the captured image.

To register the color of the object, the user operates the mouse serving as the input device to move a mouse cursor while viewing the video image 500 presented on a user interface screen. In a case of the example in FIG. 2A, the user recognizes an area of the hand 510 in the captured image, and designates an area 550 by dragging and moving the mouse cursor from a position 530 to a position 540. Thus, information about luminance and color tone of an image included in the area 550 designated by movement of the cursor is acquired as color information about the object. The information about the luminance and color tone are mapped to, for example, a YCbCr space, and a three-dimensional registered color area 560 in FIG. 2C is formed. As discussed in Japanese Patent Application Laid-Open Nos. 2005-107967 and 2005-228140 described above, a registered color area 570 that is obtained by projecting the three-dimensional registered color area 560 onto a CbCr plane is used in order to eliminate influence of color change caused by difference in luminance condition and the like, thus extracting a color from the captured image.

Figure 2B:
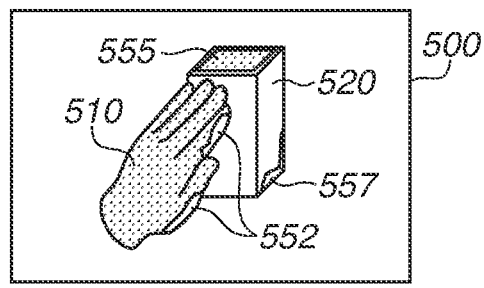
Figure 2C:
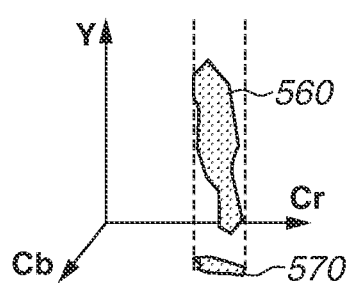

FIG. 2B is a diagram illustrating a result of extracting an area estimated to have the object color, from the captured image by using the registered color area 570 in FIG. 2C. In the example of FIG. 2B, an undetected area 552, which is an inside of the hand 510 and cannot be extracted, and erroneously-detected areas 555 and 557, which are erroneously extracted from the background area, are displayed in the video image 500 representing the extraction result. Here, the undetected area and the erroneously-detected area are to be excluded because the undetected area and the erroneously-detected area are noise areas in extraction of the object area.

Thus, the user performs operation to exclude the noise on the displayed video image 500 by using the mouse.

Figure 2D:
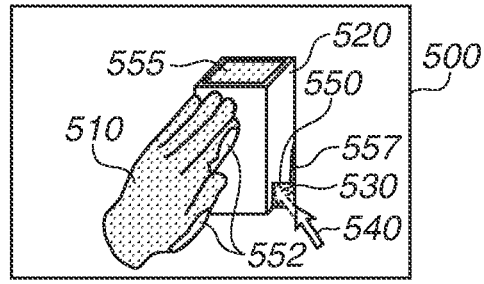

FIG. 2D is a diagram schematically illustrating a state where the user designates noise. To exclude the erroneously-detected area 557 (dark area of box 520) as noise, the user initially designates the area 550 by dragging and moving the mouse cursor from the position 530 to the position 540. Thus, the information about the luminance and color tone of an image in the designated area 550 is acquired, and the information about the luminance and color tone is registered as information about an unregistered color.

Figure 2E:
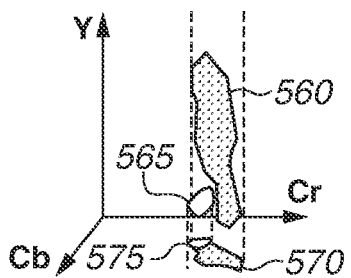
Figure 2F:
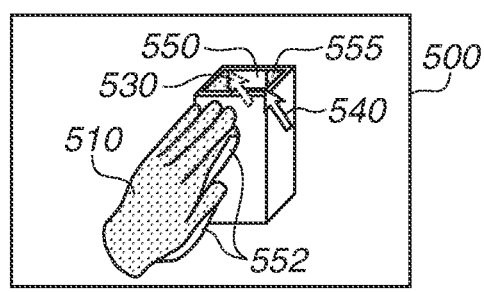

FIG. 2E is a diagram illustrating a state of the color space (YCbCr space) after the unregistered color is set. An area 565 in the YCbCr space is set as an unregistered color area. The unregistered color area 565 is projected onto the CbCr plane, and an area 575 is formed. Here, in an area where the previously-set registered color area 570 and the unregistered color area 575 are overlapped, the unregistered color area 575 is given a higher priority (in case where overlapped area is present, area most recently designated by user is given a higher priority). Here, the registered color area 570 is eroded by the unregistered color area 575, and registered colors regarded as the object is decreased. As a result, as illustrated in FIG. 2F, the undetected area 552 in the area of the hand 510 is expanded as compared with the state in FIG. 2D. The erroneously-detected area 557, however, is excluded as expected.

Next, to exclude the erroneously-detected area 555, which is a noise appearing in a bright part of the yellow box 520, the user designates the area 550 by dragging the mouse cursor from the position 530 to the position 540 illustrated in FIG. 2F. Thus, the information about the luminance and color tone of an image included in the designated area 550 is acquired, and the information about the luminance and color tone is registered as information about an unregistered color.

Figure 2G:
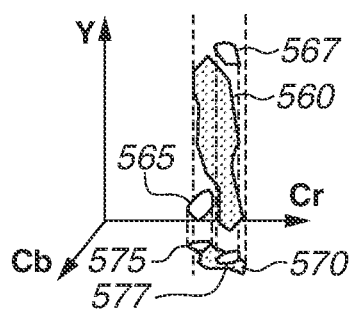
Figure 2H:
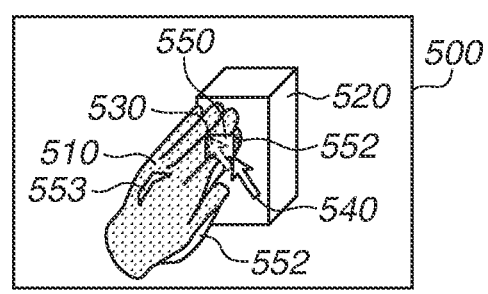

FIG. 2G is a diagram illustrating a state of the color space (YCbCr space) after the unregistered color is set. An unregistered color area 567, which is newly added, is set, the unregistered color area 567 is similarly projected onto the CbCr plane, and an area 577 is formed. At this time, as with the above description, in an area where the registered color area 570 and the unregistered color area 577 are overlapped, the newly-set unregistered color area 577 is given a higher priority, and noise of an undetected area appears in the bright area 553 of the hand 510 as illustrated in FIG. 2H. The erroneously-detected area 555, however, is excluded as expected.

Next, to bring the state of the undetected area 552 of the hand 510 into the state in which the undetected area 552 is detectable, the user designates and registers colors of the undetected areas 552 and 553.

Figure 2I:
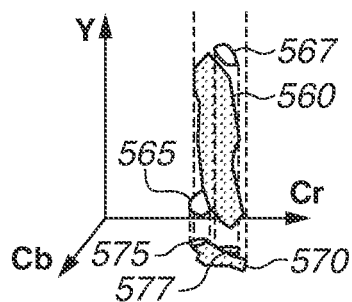
Figure 2J:
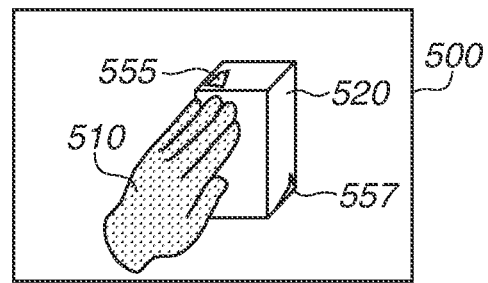

FIG. 2I is a diagram illustrating a state of the color space (YCbCr space) after the registered color area is additionally set. As compared with the registered color area 560 in FIG. 2G in the previous state, the registered color area 560 in FIG. 2I is expanded. Further, the registered color area 560 is projected onto the CbCr plane, which forms the registered color area 570 after projection. In a case where the registered color area 570 includes areas overlapped with the unregistered color areas 575 and 577, the overlapped areas are overwritten as the registered color area 570. Thus, the erroneously-detected area 555 and the erroneously-detected area 557 appear again as illustrated in FIG. 2J.

The adjustment is performed to minimize the erroneously-detected area and the undetected area by repeatedly setting the registered colors and the unregistered colors as described above. If the erroneously-detected area and the undetected area become less than or equal to predetermined threshold pixels, the erroneously-detected area and the undetected area are excluded as the noise areas, and the object area can be extracted as expected. In the case of such setting and processing, however, the adjustment takes a long time and a lot of labor. In the above-described example, the still image is described; however, more time and labor are taken in a case of a moving image. More specifically, a plurality of sample images is to be acquired from a moving image, and the adjustment is to be performed so as to minimize the erroneously-detected area and the undetected area for all of frames of the moving image by repeating the above-described processing, which takes more time and labor.

In Japanese Patent Application Laid-Open No. 2005-228140 described above, colors are extracted by using information about YCbCr space (three-dimensional color space) without performing projection onto the CbCr plane (two-dimensional color space). Since the projection onto the CbCr plane is not performed, determination of the overlapped areas on the projection plane is unnecessary. However, to reduce the erroneously-detected area and the undetected area for all of the frames of the moving image, it is necessary to previously register all of luminance information and color tone information (YCbCr values) of an area where the object may appear in the image. In other words, as compared with the case where colors are extracted by using only the CbCr values, it is necessary to acquire more color information about the object in the image, and it takes a time for the user operation.

Figure 3A:
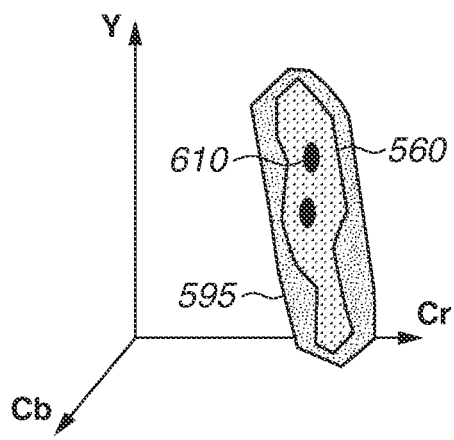
FIGS. 3A to 3F are diagrams illustrating expansion in a luminance direction and an area extracted as an object.
Figure 3B:
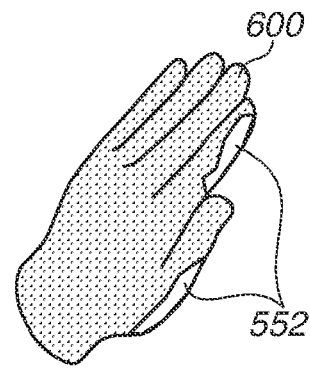
Figure 3C:
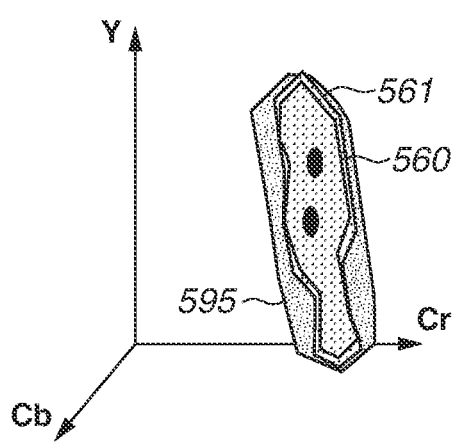
Figure 3D:
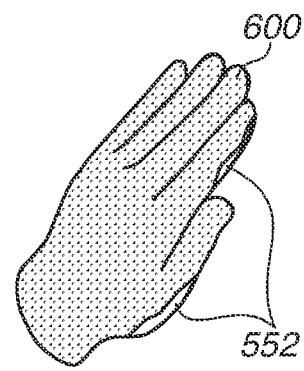

For example, in a case where a color of a partial area of the object in one captured image is registered with the YCbCr values as illustrated in FIG. 2A based on an instruction from the user, color information for extraction is insufficient and the undetected area may remain. This phenomenon will be described with reference to FIG. 3A and FIG. 3B. FIG. 3A is a diagram illustrating a difference between the registered color area 560 and a correct area 595 in the three-dimensional color space in the case where the color of the area illustrated in FIG. 2A is registered with the YCbCr values. In this case, the difference between the registered color area 560 and the correct area 595 in FIG. 3A is the undetected area, and an undetected area 552 remains as illustrated in FIG. 3B. To detect the object based on the color data in the two-dimensional color space, the object is detected by using only the color tone information without reference to the luminance information. Thus, a bright area and a dark area may be erroneously detected as areas having the color of the object even though the areas are not the object areas. In a case where the detection is performed in the three-dimensional color space, the luminance information is also used for the determination, and the detection is performed by using the luminance information obtained from the object, which reduces erroneous detection caused by the luminance information. However, since the luminance is added to the color information to be acquired, in addition to the color tone, a necessary amount of input data to minimize the undetected area and the erroneously-detected area is increased as compared with a case where the detection is performed in the two-dimensional color space.

Thus, the image processing apparatus 100 according to the present exemplary embodiment realizes object extraction processing through which the time and the labor to be taken for adjustment is reduced by expanding the registered color area 560 and the unregistered color area 565 in the luminance direction and the color tone direction in the three-dimensional color space, thus reducing generation of the erroneously-detected area and the undetected area.

As illustrated in FIG. 1, the image processing apparatus 100 according to the present exemplary embodiment includes a storage unit 110, a color information registration unit 120, an extraction unit 140, an expansion unit 130, and an output unit 115.

The storage unit 110 is a temporary storage medium that stores data of the object area in the captured image determined by the image processing apparatus 100 and other data and transmits the data to another program, and includes, for example, a memory or a hard disk. In the present exemplary embodiment, the storage unit 110 stores information including, for example, a captured image input from the image capturing unit 101, a color information table used for object extraction, an extracted area image representing an extraction result of the extraction unit 140, an attribute imparting condition table, the number of expansions in the luminance direction, and the number of expansions in the color tone direction. Details of the information will be described below. In the present exemplary embodiment, the storage unit 110 is not limited to storage of the data and the information, and can store other pieces of information to be used for processing.

FIG. 4 is a diagram illustrating an example of the color information table. Data based on the luminance information (Y) and the color tone information (Cb and Cr) is stored in the color information table. For example, as the luminance information (Y), 8-bit information from 0 to 255 is stored as an index. Similarly, as the color information (Cb and Cr), information from 0 to 255 is stored as an index. In the color information table, the YCbCr values are arranged as illustrated in FIG. 4, and attribute information and expansion information are in association with the corresponding YCbCr values. The attribute information is information about, for example, "registered color", "unregistered color", and "none", which are selectable. As the expansion information, for example, "0" is stored in a case of a color not subjected to expansion processing, and "1" is stored in a case of a color subjected to the expansion processing.

The number of expansions in the luminance direction and the number of expansions in the color tone direction are information for setting the number of execution times of expansion processing in the luminance direction and in the color tone direction in the three-dimensional color space. The area to be expanded is increased as the number of expansions is increased. In the present exemplary embodiment, the number of expansions in the luminance direction and the number of expansions in the color tone direction are each set to one time.

The color information registration unit 120 is a module for the user to input the object area or the background area in the captured image through the input unit 150. In the present exemplary embodiment, the user designates the object area or the background area in the captured image by, for example, dragging the mouse of the input unit 150. In other words, the color information registration unit 120 includes a color information acquisition function of acquiring color information for an area designated by the user from a first image that is captured by the image capturing unit 101 and stored in the storage unit 110, and a color information registration function of registering the color information in the color information table of the storage unit 110. In the present exemplary embodiment, the values of the YCbCr space are used as the color information; however, a representation method is not limited to the YCbCr space, and other color space representation methods (e.g., Lab or HSV) are applicable.

The expansion unit 130 reads out the color information about the object area and the color information about the background area stored in the storage unit 110, and expands these pieces of information in the three-dimensional color space. In the present exemplary embodiment, the expansion unit 130 acquires the color information table from the storage unit 110, refers to data in which the attribute of the YCbCr values is "registered color" or "unregistered color", and expands a color area of interest in the YCbCr three-dimensional color space. Expanding the color information in the three-dimensional color space makes it possible to reduce an undetected area 610 inside the registered color area 560 as illustrated in FIG. 3A, and to reduce the gap between the registered color area 560 and the correct area 595. Similarly, the expansion unit 130 performs the expansion processing on the unregistered color area in the three-dimensional color space, and estimates the background color not yet acquired, thus reducing the erroneously-detected area. As for the YCbCr values that are determined to be expanded by the expansion processing, the expansion unit 130 changes the attribute information in the color information table in FIG. 4 of the storage unit 110 from "none" to "registered color" or "unregistered color". The expansion unit 130 changes the value of the expansion information in the color information table from "0" to "1", to record the YCbCr values as the color expanded and registered. Details of these expansion processing will be described below.

The extraction unit 140 extracts the object area from a second image captured by the image capturing unit 101, based on the color information about the object area and the color information about the background area acquired from the first image, and the color information expanded by the expansion unit 130 described above. In the present exemplary embodiment, the extraction unit 140 refers to the YCbCr values for which the attribute are set to "registered color" in the color information table of the storage unit 110, and detects pixels the colors of which match each other, from pixels of the captured image recorded in the storage unit 110. Thereafter, the extraction unit 140 outputs an area of the detected pixels as an "extracted area image" representing the object area, to the storage unit 110.

The output unit 115 outputs the image of the object area extracted by the extraction unit 140, to the display unit 270. In the present exemplary embodiment, the output unit 115 generates a display image in which the object area generated by the extraction unit 140 is colored and combined over the captured image stored in the storage unit 110, and outputs the display image to the display unit 270. As a result, the user can check an overdetected state and an undetected state occurring in extraction of the object area, via the display of the display unit 270.

Figure 5:
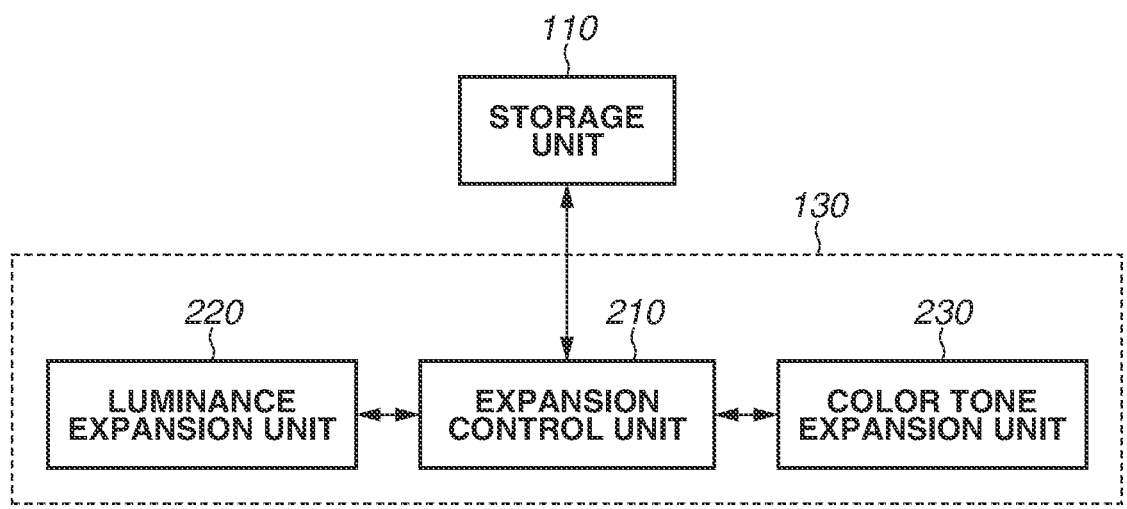
FIG. 5 is a diagram illustrating a functional configuration example of an expansion unit.

FIG. 5 is a block diagram illustrating a detailed configuration of the expansion unit 130. The expansion unit 130 includes an expansion control unit 210, a luminance expansion unit 220, and a color tone expansion unit 230.

The expansion control unit 210 refers to the YCbCr values of data for which the attribute is set to the "registered color" or "unregistered color" in the color information table acquired from the storage unit 110, and maps the data to the three-dimensional color space in the memory. As a result of the mapping, for example, a state of the three-dimensional color space as illustrated in FIG. 3A is obtained. FIG. 3A illustrates a state where the user first registers the color by using the color information registration unit 120 via the input unit 150.

If the extraction by the extraction unit 140 is performed in the state of FIG. 3A, the area of the hand to be extracted is not wholly extracted as the detected area 600, and a part of the area remains as the undetected area 552 as illustrated in FIG. 3B. This is because the registered color area 560 is smaller than the correct area 595 illustrated in FIG. 3A. Thus, the expansion control unit 210 performs control to expand the registered color area 560 such that the registered color area 560 approaches the correct area 595.

The expansion control unit 210 first controls the luminance expansion unit 220 to perform expansion in the luminance (Y) direction, and further controls the color tone expansion unit 230 to perform expansion in the color tone (Cb and Cr) direction. In the present exemplary embodiment, however, the expansion is not limited to independent expansion in the luminance direction and in the color tone direction, and expansion in the luminance direction and expansion in the color tone direction may be performed at the same time. The correct area 595 illustrated in FIG. 3A is an area set for description of the processing, and is not known information in the actual processing.

The luminance expansion unit 220 refers to the color information mapped to the three-dimensional color space by the expansion control unit 210 and expands the registered color or the unregistered color in the luminance direction. The expansion is performed to interpolate and fill up, for example, a hole of the undetected area 610 illustrated in FIG. 3A, with the registered color or the unregistered color. Filling up of the hole contributes to reduction in area of the undetected area 552 as illustrated in FIG. 3A. In a case where a color (YCbCr values) of current interest meets the expansion condition, the luminance expansion unit 220 updates the "attribute" information and the "expansion" information corresponding to the YCbCr values of the color of interest, in the color information table of the storage unit 110. The detail of the processing will be described below.

The color tone expansion unit 230 refers to the color information mapped to the three-dimensional color space by the expansion control unit 210 and expands the registered color or the unregistered color in the color tone direction. In a case where the color (YCbCr values) of current interest meets the expansion condition, the color tone expansion unit 230 updates the "attribute" information and the "expansion" information in the color information table of the storage unit 110, as with the luminance expansion unit 220. The detail of the processing will be described below.

FIG. 6 is a flowchart illustrating processing of the color information registration and the expansion processing which are performed by the image processing apparatus 100 according to the present exemplary embodiment. The processing in the flowchart of FIG. 6 is repeatedly performed every time the captured image from the image capturing unit 101 is updated. Further, in the present exemplary embodiment, the processing to register the color information is performed before the user experiences the mixed reality, and it is unnecessary for the user to register the color during the experience. In a case where the color information about the object is previously registered as described above, processing including operations in steps S110, S120, S140, and S145 in the flowchart of FIG. 6 is performed. In contrast, in a case where only the color extraction is performed when the user experiences the mixed reality, the processing is performed by skipping the operations in steps S110, S120, S140, and S145.

In step S100, the image processing apparatus 100 acquires the captured image from the image capturing unit 101, and the storage unit 110 stores the captured image. Note that the image to be stored in the storage unit 110 is not limited to the captured image from the image capturing unit 101, and a rendered CG image may be input and stored.

Next, in step S110, the color information registration unit 120 determines whether the user has selected an image via the input unit 150. If the user has selected an image (YES in step S110), the processing proceeds to step S120. If the user has not selected an image (NO in step S110), the processing returns to step S100, and a captured image of a next frame is processed.

In step S120, the color information registration unit 120 acquires color information included in the area 550 designated by the user, in the captured image selected in step S110, and registers the color information in the color information table in the storage unit 110. The area 550 is designated by, for example, the user operating the mouse cursor of the input unit 150 to designate the area in the captured image, as illustrated in FIG. 2A. In the present exemplary embodiment, the registration is not limited to the case where the user individually registers the object area and the background area of the selected captured image, and is applicable to a case where a color of an area previously fixed in the captured image is acquired as the color of the object. Alternatively, the object area may be determined by a determiner that has been previously trained through machine learning, and color information about the area may be acquired.

Next, in step S130, the extraction unit 140 extracts the object area in the selected captured image based on the color information table of the storage unit 110. In the extraction processing, the extraction unit 140 refers to the YCbCr values for which the "attribute" information in the color information table is set to the registered color and extracts the object area. In other words, since the registered color is information about the object, what is extracted based on the registered color is the object area.

Figure 3E:
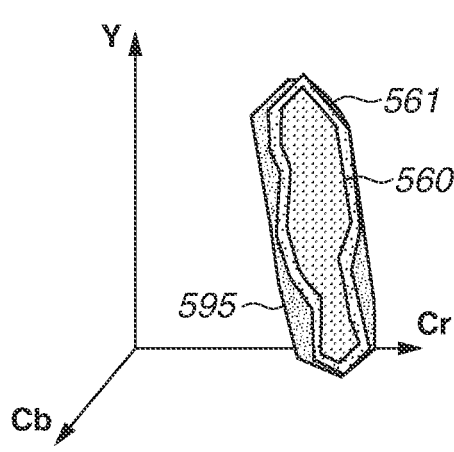
Figure 3F:
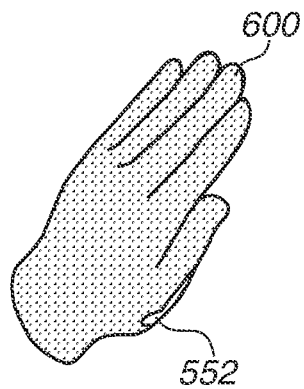

Next, in step S140, the expansion unit 130 determines the color information to be expanded as the registered color, based on the color information for which the attribute information in the color information table is set to "registered color". The detail of the processing will be described below with reference to a flowchart of FIG. 8. For example, in a case where the color information registration unit 120 registers the registered color area 560 illustrated in FIG. 3A in the color space, the registered color area 560 is expanded in the luminance direction and the color tone direction to an area 561 illustrated in FIG. 3E, through the processing in step S140. As a result, the result of the color extraction in step S130 in a case where only the color extraction is to be performed afterward is changed from the state in FIG. 3B to a state in FIG. 3F, and the detected area 600 is increased and the undetected area 552 is reduced.

Figure 7A:
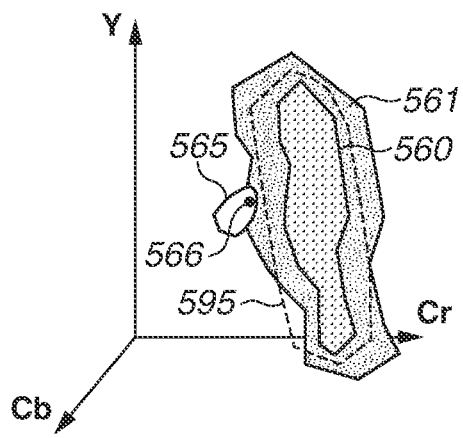
FIGS. 7A to 7D are diagrams used for description of processing to expand a background color.
Figure 7B:
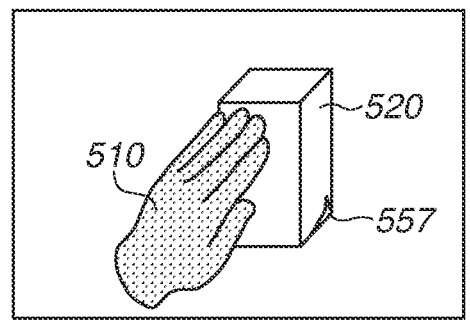
Figure 7C:
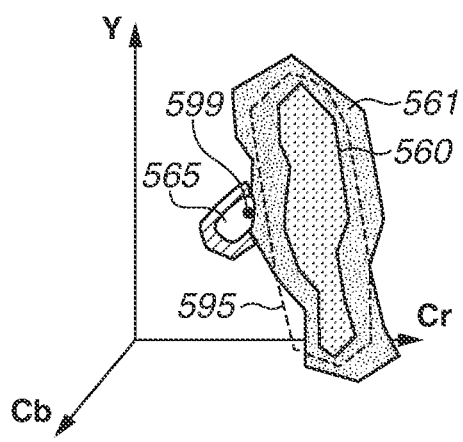
Figure 7D:
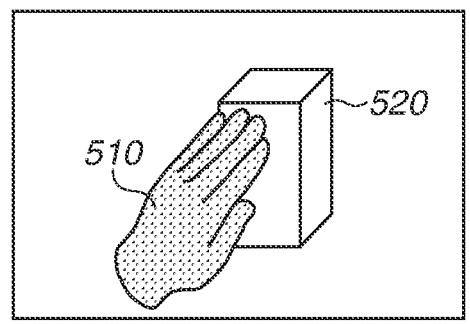

Next, in step S145, the expansion unit 130 determines the color information to be expanded as the unregistered color, based on the color information in which the attribute information in the color information table is set to "unregistered color". The detail of the processing will be described below with reference to the flowchart of FIG. 8. Here, for example, a case where the registered color area 560, the expanded registered color area 561, and the unregistered color area 565 are registered as illustrated in FIG. 7A is assumed. FIG. 7A illustrates an example in which a hole area 566 is present in the unregistered color area 565 and the hole area 566 is the registered color area. In this state, as illustrate in FIG. 7B, the erroneously-detected area (area 557) occurs outside the object area. Through the operation in step S145, the unregistered color area 565 is expanded in the luminance direction and the color tone direction to an area 599 in FIG. 7C. As a result, the hole area 566 is filled as the unregistered color area. Thus, the area 557, which is the erroneously-detected area, disappears as illustrated in FIG. 7D in the color extraction in step S130 in the case where only the color extraction is to be performed afterwards.

Next, in step S150, the color information registration unit 120 determines whether the user has issued an end instruction through the input unit 150. If the end instruction has not been issued (NO in step S150), the processing returns to step S100. If the end instruction has been issued (YES in step S150), the image processing apparatus 100 ends the processing in the flowchart of FIG. 6.

The processing when the color information about the object is mainly registered has been described above. In a case where only the color extraction is performed when the user experiences the mixed reality, the operations in steps S110, S120, S140, and S145 are skipped as described above.

In the present exemplary embodiment, the registered color expansion processing and the unregistered color expansion processing are separately performed, respectively, in step S140 and step S145; however, the processing is not limited thereto, and both expansion processing may be performed at the same time. In a case where both expansion processing is performed at the same time, the expansion processing is performed by mapping the registered color and the unregistered color to the three-dimensional color space handled by the luminance expansion unit 220 and the color tone expansion unit 230 described below, at the same time.

FIG. 8 is a flowchart illustrating the detail of the processing which is performed by the expansion unit 130. The operations in steps S140 and S145 in FIG. 6 correspond to the processing in the flowchart of FIG. 8.

In step S300, the expansion control unit 210 registers the color information in the three-dimensional color space of the memory based on the color information read out from the storage unit 110.

FIGS. 9A to 9F are schematic diagrams illustrating the expansion processing. To simplify the description, FIGS. 9A to 9F each illustrate an extracted YCr space (two-dimensional color space) with a Cb value fixed in the YCbCr space that is originally a three-dimensional space. For simplification, a predetermined range of a specific Y value and a specific Cr value is extracted and displayed. Symbols in blocks of FIGS. 9A to 9F are determined by a combination of the attribute information and the expansion information. In the present exemplary embodiment, the symbols are defined as follows.

In a case where the attribute information is "registered color" and the expansion information is "0", the symbol is "P". In a case where the attribute information is "registered color" and the expansion information is "1", the symbol is "Q". In a case where the attribute information is "unregistered color" and the expansion information is "0", the symbol is "N". In a case where the attribute information is "unregistered color" and the expansion information is "1", the symbol is "M".

Next, in step S310, the luminance expansion unit 220 sequentially selects, as a color of interest, the items in the order from a first item in which the YCbCr values are all zero to a final item in which the YCbCr values are all 254 in the color information table illustrated in FIG. 4. In a case where the attribute information about the color of interest is "registered color" or "unregistered color", the luminance expansion unit 220 skips the processing for the color of interest, and sets the next color in the color information table to the color of interest. In a case where the attribute information for the color of interest is "none", the luminance expansion unit 220 refers to attribute information for an adjacent color that has the same color tone and the luminance greater or less by one than the luminance of the color of interest when the YCbCr values of the color of interest are mapped to the three-dimensional color space.

Figure 10:
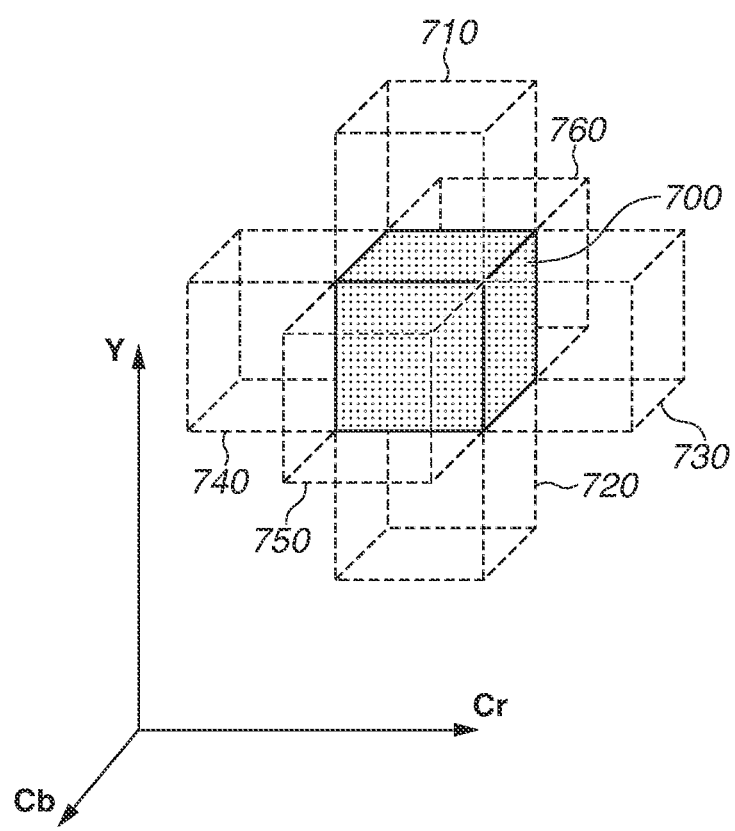
FIG. 10 is a diagram illustrating an expansion direction in the three-dimensional color space.

FIG. 10 is a diagram illustrating a direction of expansion in the three-dimensional color space. For example, in a case where a color of interest is a color of interest 700 in the color space illustrated in FIG. 10, the luminance expansion unit 220 refers to an attribute of a color 710 and an attribute of a color 720. The luminance expansion unit 220 determines an attribute of the color of interest 700 based on the attribute imparting condition table of FIG. 11 previously registered in the storage unit 110, and records the attribute of the color of interest 700 in the attribute information in the color information table of the storage unit 110.

Figure 9A:
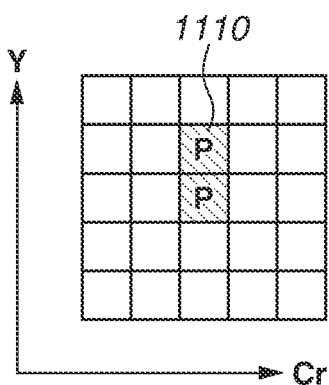
FIGS. 9A to 9F are diagrams used for description of a three-dimensional color space in the expansion processing.
Figure 9B:
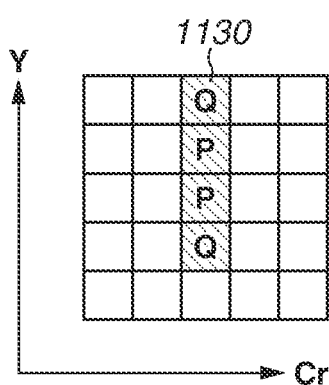

Next, since the color of interest 700 is registered after being expanded, the luminance expansion unit 220 replaces the expansion information in the color information table of the storage unit 110 with "1". For example, in a case where the attribute of the color 710 having a luminance greater by one than the luminance of the color of interest 700 is "registered color" and the attribute of the color 720 having a luminance less by one than the luminance of the color of interest 700 is "none", the attribute information for the color of interest 700 is "registered color". FIGS. 9A and 9B illustrate an example in a case where luminance expansion of the registered color is first performed. As a result of expansion performed, in the luminance direction, on a registered color 1110 registered in the three-dimensional color space, an area 1130 represented by the symbol Q is registered as the registered color as illustrated in FIG. 9B.

In step S315, the expansion control unit 210 acquires the number of expansions in the luminance direction from the storage unit 110, and determines whether the number of expansions has reached the prescribed number of times. If the number of expansions in the luminance direction has reached the prescribed number of times (YES in step S315), the processing proceeds to step S320. If the number of expansions in the luminance direction has not reached the prescribed number of times (NO in step S315), the processing returns to step S310.

In step S320, the color tone expansion unit 230 sequentially selects, as a color of interest, the items in the order from a first item in which the YCbCr values are all zero to a final item in which the YCbCr values are all 254 in the color information table illustrated in FIG. 4. In a case where the attribute information for the color of interest is "registered color" or "unregistered color", the color tone expansion unit 230 refers to attribute information for an adjacent color that has the same luminance and the color tone greater or less by one than the color tone of the color of interest when the YCbCr values of the color of interest are mapped to the three-dimensional color space in a case where the attribute information for the color of interest is "none".

Figure 9C:
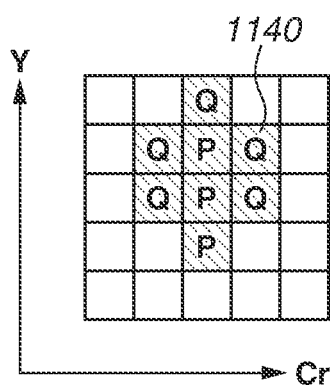

For example, in a case where a color of interest is the color of interest 700 in the color space illustrated in FIG. 10, the color tone expansion unit 230 refers to the attribute of each of colors 730, 740, 750, and 760. The color tone expansion unit 230 determines the attribute of the color of interest 700 based on the attribute imparting condition table of FIG. 11 previously registered in the storage unit 110, and records the attribute of the color of interest 700 in the attribute information in the color information table of the storage unit 110. For example, in a case where the attribute of the color 730 is "registered color", the attribute of the color 740 is "none", the attribute of the color 750 is "unregistered color", and the attribute of the color 760 is "none", the attribute of the color of interest 700 is "none". FIG. 9C illustrates an example in a case where the expansion of the registered color in the color tone direction is performed. If the expansion processing in the color tone direction is performed in the state of FIG. 9B, an area 1140 represented by the symbol Q is registered as the registered color as illustrated in FIG. 9C.

In step S325, the expansion control unit 210 acquires the number of expansions in the color tone direction from the storage unit 110, and determines whether the number of expansions has reached the prescribed number of times. If the number of expansions in the color tone direction has reached the prescribed number of times (YES in step S325), the processing ends. If the number of expansions in the color tone direction has not reached the prescribed number of times (NO in step S325), the processing returns to step S320.

Figure 9D:
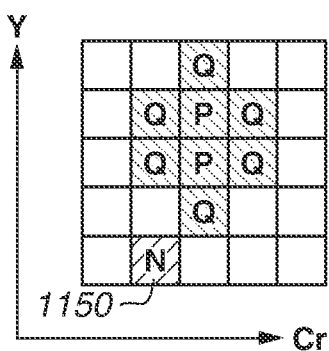

FIG. 9D is a schematic diagram when the unregistered color 1150 is initially mapped to the three-dimensional color space in a case where the expansion unit 130 expands the unregistered color in step S145 in FIG. 6.

In this case, the expansion in the luminance direction is performed in step S310; however, as a result of the processing based on the attribute imparting condition table in FIG. 11, expansion is not performed in the displayed area, which results in no change. This is because adjacent blocks have the attribute of the registered color and the attribute of the unregistered color.

Figure 9E:
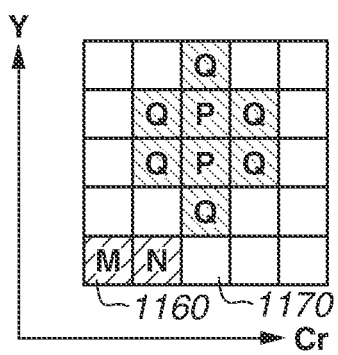

In contrast, in the expansion processing in the color tone direction in step S320, the attribute of the unregistered color is set to a block 1160 as illustrated in FIG. 9E. Expansion to a block 1170 is not performed because an adjacent block has the attribute of the registered color.

In the present exemplary embodiment, the registered color and the unregistered color are not independently expanded, and control is performed such that expansion to a block where overlapping occurs is intentionally prevented, through the above-described processing. In other words, when expanding the color information about the object in the three-dimensional color space, the expansion control unit 210 of the expansion unit 130 refers to the position of the color information about the background in the three-dimensional color space and controls the expansion so as not to generate overlapping. As a result, according to the present exemplary embodiment, it is possible to reduce the erroneously-detected area 557 and the undetected area 552 of the extracted object area without bias.

<First Modification>

In the first exemplary embodiment as described above, the expansion in the luminance direction and the expansion in the color tone direction are each performed one time; however, the number of expansions is not limited to one time, and the number of expansions in the luminance direction and the number of expansions in the color tone direction are not limited to the same number of times. The number of expansions may be previously set, or may be set to any number of times by the user.

In a first modification of the first exemplary embodiment, a case where the number of expansions is changed will be described. For example, a case where the number of expansions in the color tone direction is set to two times will be described. A configuration of the image processing apparatus 100 according to the first modification is similar to the above-described configuration. Thus, illustration and description of the configuration are omitted. Processing to realize the first modification is similar to the processing in the above-described flowchart. In the above description, the operation in step S310 and the operation in step S320 in the flowchart illustrated in FIG. 8 are each performed one time. However, in a case where the number of expansions is set to two times as in the first modification, the operation in step S310 and the operation in step S320 are each performed two times.

Figure 9F:
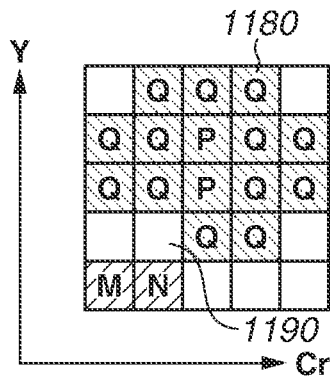

As a result of the processing according to the first modification, the area of the registered color is expanded as illustrated by an area of a registered color 1180 in FIG. 9F. However, the area of the registered color is not expanded to a block 1190 that is adjacent to a block with the registered color as the attribute information and a block with the unregistered color as the attribute information.

In a case where the number of expansions in the luminance direction is set greater than the number of expansions in the color tone direction, an expansion width is increased in the luminance direction. In particular, in a scene where the object moves between a bright place and a dark place, an adjustment to increase the number of expansions in the luminance direction enables reduction of the undetected area.

In a scene where a user who is experiencing a virtual space moves among rooms different in illumination color temperature, an adjustment to set the number of expansions in the color tone direction greater than the number of expansions in the luminance direction enables reduction of the undetected area.

<Second Modification>

In an above-described example, the number of expansions is previously stored in the storage unit 110 and is not changed during the processing. The number of expansions is not limited to the number of expansions fixed during the processing. As a second modification, after the user checks the extraction result of the object in the current captured image on the display unit 270, the user may issue an instruction to change the number of expansions for the same image.

To realize the processing according to the second modification, the user changes the number of expansions to be stored in the storage unit 110, via the color information registration unit 120 by inputting the number of expansions using the input unit 150, and performs the above-described processing.

A second exemplary embodiment of the present disclosure will be described. In the first exemplary embodiment, the color information registration unit 120 acquires the input from the user via the input unit 150 when the color of the object is registered. However, the input from the user is not always correct, and the user may register a color that is not a color of the object area. In this case, for example, the color of the background may be erroneously registered in the registered color as the color of the object, resulting in an increase in the erroneously-detected area in the extraction result. Further, when expansion processing as described above is performed, the registered color is expanded, which may prompt an increase in the erroneously-detected area.

Thus, in the second exemplary embodiment, a description will be provided of an image processing apparatus that automatically prevents registration of an incorrect area even when the input by the user is incorrect.

Figure 12:
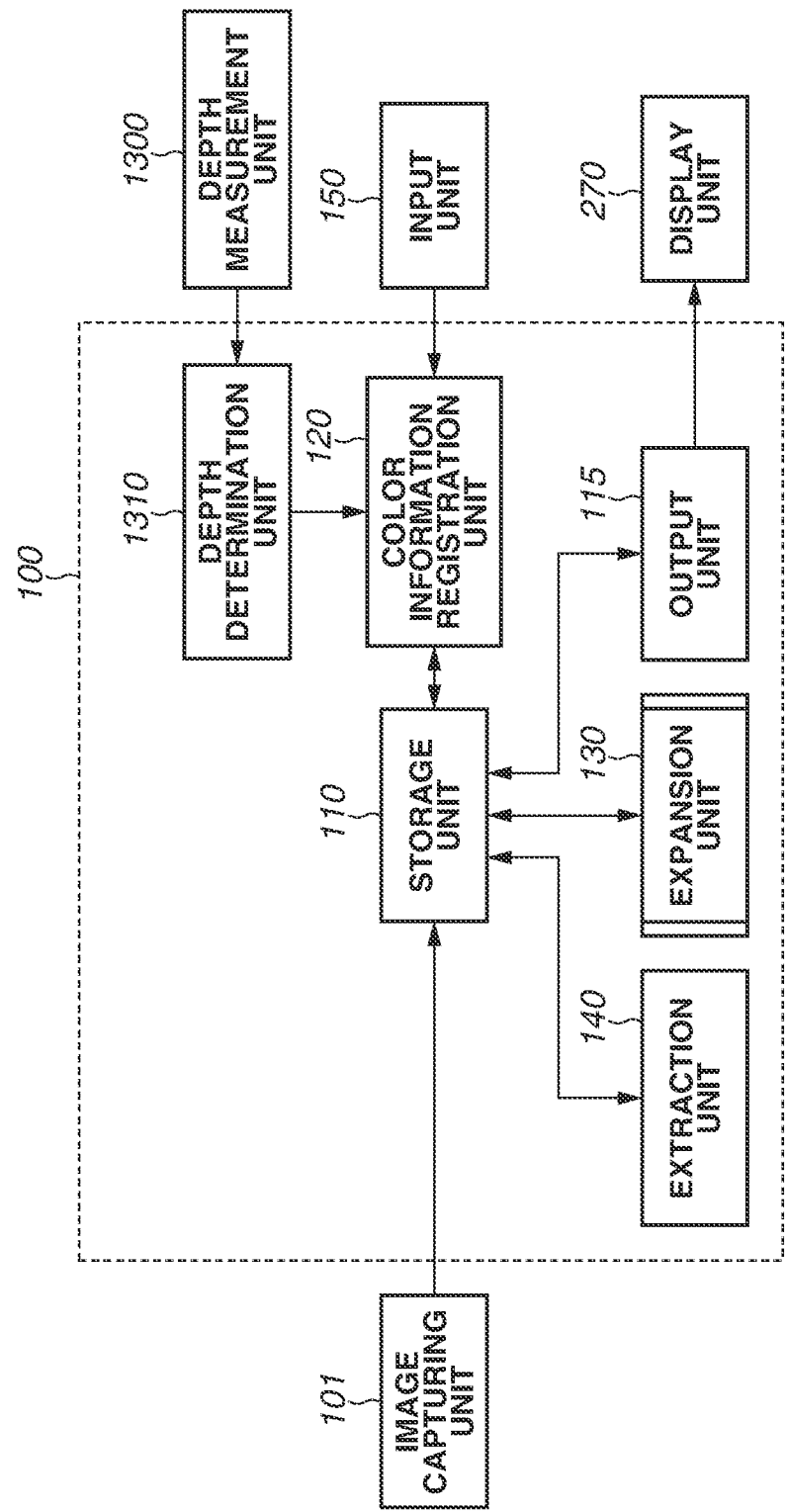
FIG. 12 is a diagram illustrating a configuration example of an image processing apparatus according to one or more aspects of the present disclosure.

FIG. 12 is a block diagram illustrating a configuration example of an image processing apparatus 100 according to the second exemplary embodiment. A configuration in FIG. 12 includes a depth measurement unit 1300 and a depth determination unit 1310 in addition to the configuration illustrated in FIG. 1.

The depth measurement unit 1300 is a distance acquisition unit configured to acquire information about a distance from the image capturing unit 101 to the object or the like. In the present exemplary embodiment, the depth measurement unit 1300 measures, as a depth value, the distance from the image capturing unit 101 to the object or the like, and assigns the depth value to each of the pixels of the captured image. In the second exemplary embodiment, for example, the depth values on the captured image are measured by conventional stereo matching processing based on the assumption that the image capturing unit 101 is a stereo camera. Note that other devices such as a depth sensor may be used to acquire depth information.

The depth determination unit 1310 refers to the depth values on the captured image obtained by the depth measurement unit 1300, and locates the positions of pixels each having the depth value within a predetermined distance range. The depth determination unit 1310 sets a value of one to a pixel having the depth value within a predetermined range on the captured image, and sets a value of zero to the other pixels, thus generating an image of an area within an adequate distance. The generated image of the area within the adequate distance is input to the color information registration unit 120, and the area other than the object that is to be incorrectly input by the user is automatically eliminated.

To realize the processing according to the present exemplary embodiment, in step S120 in FIG. 6, only color information for the area that has a value of one within the adequate distance generated by the depth determination unit 1310, out of the object area designated by the user, is recorded in the color information table in the storage unit 110.

Figure 13A:
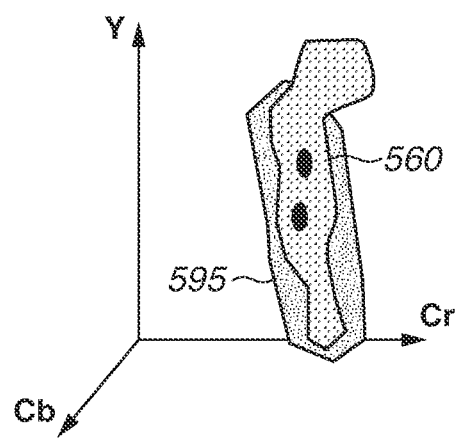
FIGS. 13A to 13D are explanation diagrams illustrating processing to correct erroneous input by a user based on depth information.
Figure 13B:
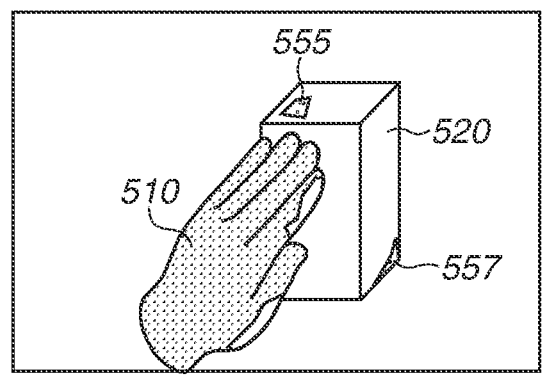

For example, in a case where the user erroneously encloses the object and the background at the same time for designation, a registered color area 560 in the three-dimensional color space as illustrated in FIG. 13A is generated. A part of the registered color area 560 deviates from the correct area 595. In a case where the object is extracted by using the color information table thereof, erroneously-detected areas 555 and 557 are detected as noises as illustrated in FIG. 13B.

Figure 13C:
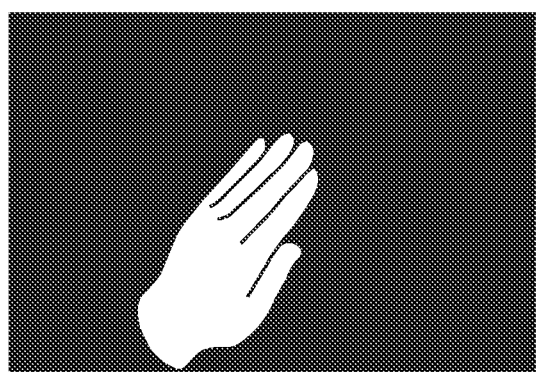
Figure 13D:
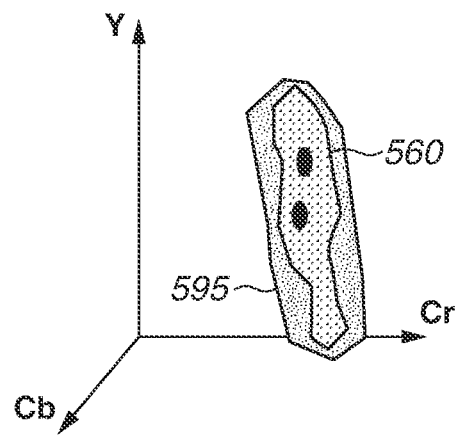

When the distance, from the image capturing unit 101 in the depth direction, for which the depth determination unit 1310 determines that the object is highly likely to be present, is input as a predetermined distance area, the image of the area within the adequate distance as illustrated in FIG. 13C is obtained. In the second exemplary embodiment, the color information is registered by using the information about the obtained image, thus enabling an automatic correction of the object area to an area as illustrated in FIG. 13D. In the second exemplary embodiment, expanding the color information makes it possible to obtain the extracted image of the object including less undetected area and less erroneously-detected area.

According to the above-described exemplary embodiments, the color information with which a specific object area can be extracted with high accuracy from the captured image can be acquired with less burden on the user in a short time.

Figure 14:
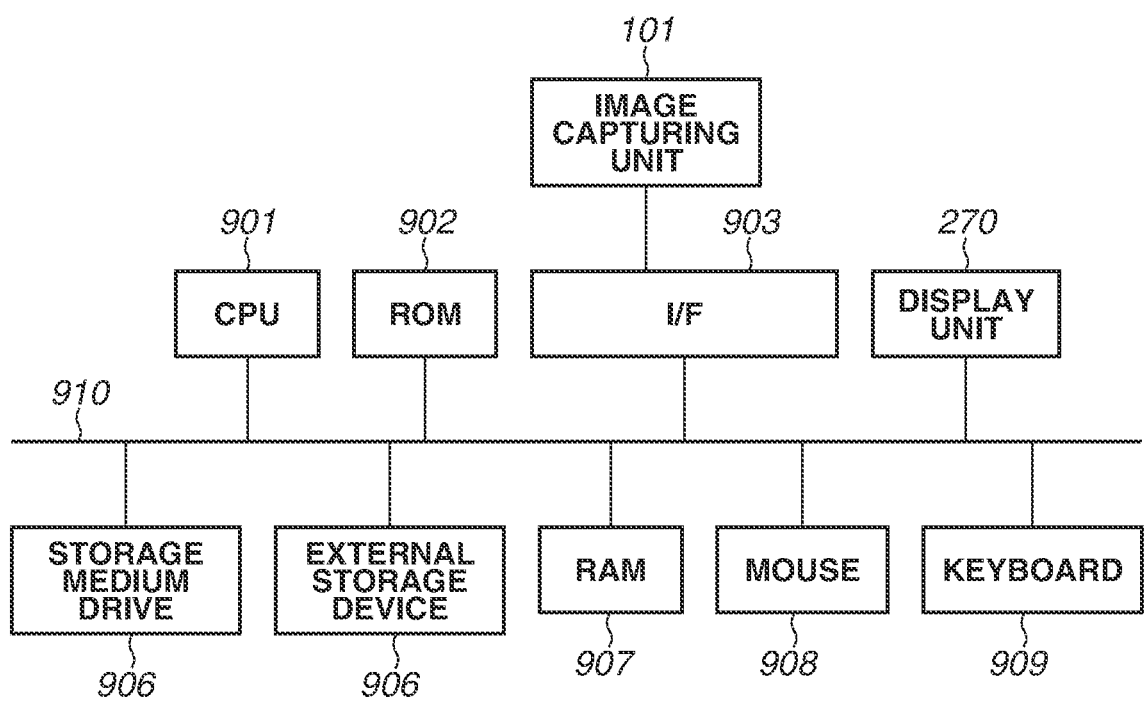
FIG. 14 is a diagram illustrating a hardware configuration example to which the image processing apparatus is applied.

FIG. 14 is a diagram illustrating a hardware configuration example of an information processing apparatus or the like that can adopt the image processing apparatus 100 according to the above-described first or second exemplary embodiment. The information processing apparatus illustrated in FIG. 14 can be realized by a common computer or the like.

A central processing unit (CPU) 901 controls the whole of the apparatus. A random access memory (RAM) 907 is used as a work area when the CPU 901 performs processing while controlling each unit. The CPU 901 operates a display control unit that controls the display unit 270. A read only memory (ROM) 902 stores a control program, various types of application programs, data, and the like. The image processing apparatus 100 in FIG. 1 or FIG. 12 is realized by the CPU 901 loading the control program stored in the ROM 902 to the RAM 907 and executing the control program. An interface (I/F) 903 is used for communication with an apparatus external to the information processing apparatus. For example, the I/F 903 acquires a signal of the captured image captured by the image capturing unit 101 in a format processible by the image processing apparatus 100. In a case where the information processing apparatus is connected to the external apparatus by a cable, a communication cable is connected to the I/F 903. In a case where the information processing apparatus includes the function of performing wireless communication with the external apparatus, the I/F 903 includes an antenna.

The information processing apparatus may include one or a plurality of pieces of dedicated hardware different from the CPU, and the dedicated hardware may perform at least a part of the processing by the CPU. Examples of the dedicated hardware includes an application specific integrated circuit (ASIC), a field programmable gate array (FPGA), and a digital signal processor (DSP). The display unit 270 includes a liquid crystal display or a light-emitting diode (LED) display, and displays a graphical user interface (GUI) for the user to operate the information processing apparatus, etc. Examples of the GUI include a GUI for the user to designate the object area and the background area described above, and a GUI for the user to designate the number of expansions. A mouse 908 and a keyboard 909 are operation devices which are operated by the user. The operation devices may include a joystick and a touch panel. An external storage device 906 is a storage device connected to the information processing apparatus. A storage medium drive 905 is a drive device that drives a storage medium such as a memory card when the storage medium is mounted on the information processing apparatus. A bus 910 connects the units of the information processing apparatus and transmits information. In the present exemplary embodiment, the external apparatus connected to the information processing apparatus include another information processing apparatus, in addition to the above-described image capturing unit 101.

The mouse 908, the keyboard 909, and the like may be present as other devices external to the information processing apparatus.

The present disclosure can be realized by supplying a program realizing one or more functions of the above-described exemplary embodiments to a system or an apparatus through a network or a storage medium, and causing one or more processors of a computer in the system or the apparatus to read out and execute the program. The present disclosure can be realized by a circuit (e.g., ASIC) realizing one or more functions.

The above-described exemplary embodiments are merely embodiment examples for implementation of the present disclosure, and the technical scope of the present disclosure should not be restrictively interpreted by the exemplary embodiments.

In other words, the present disclosure can be implemented in various forms without departing from the technical scope or main features thereof.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2021-006596, filed Jan. 19, 2021, which is hereby incorporated by reference herein in its entirety.

What is claimed is:

1. An image processing apparatus, comprising:
a processor and a memory coupled to the processor and storing instructions that, when executed by the processor, cause the processor to function as:
an acquisition unit configured to acquire color information about an object and color information about a background in a first image captured by an image capturing apparatus;
a storage unit configured to store the acquired color information about the object and the acquired color information about the background;
an expansion unit configured to expand, in a three-dimensional color space, the color information about the object and the color information about the background stored in the storage unit; and
an extraction unit configured to extract an area of the object from a second image captured by the image capturing apparatus, based on the respective pieces of the color information expanded by the expansion unit,
wherein, in a case where the expansion unit expands at least one of the color information about the object and the color information about the background in a luminance direction and a color tone direction in the three-dimensional color space, the number of expansions in the luminance direction differs from the number of expansions in the color tone direction.

2. The image processing apparatus according to claim 1, further comprising a display control unit configured to discriminably display an area corresponding to the respective pieces of the expanded color information, on the first image.

3. The image processing apparatus according to claim 1, further comprising an output unit configured to output the area of the object extracted by the extraction unit.

4. The image processing apparatus according to claim 1, wherein the storage unit stores the respective pieces of the color information in a color information table that holds, as the color information, luminance information and color tone information separately.

5. The image processing apparatus according to claim 1, wherein the expansion unit expands at least one of the color information about the object and the color information about the background, in a luminance direction in the three-dimensional color space.

6. The image processing apparatus according to claim 1, wherein the expansion unit expands at least one of the color information about the object and the color information about the background, in a color tone direction in the three-dimensional color space.

7. The image processing apparatus according to claim 1, wherein, when expanding the color information about the object in the three-dimensional color space, the expansion unit refers to a position of a region corresponding to the color information about the background in the three-dimensional color space and controls the expansion so that a region corresponding to the expanded color information about the object does not overlap a region corresponding to the color information about the background.

8. The image processing apparatus according to claim 1, wherein the expansion unit controls the expansion based on the number of expansions input by a user or a preset number of expansions.

9. The image processing apparatus according to claim 8, wherein, in a case where at least one of the color information about the object and the color information about the background is expanded in a luminance direction and a color tone direction in the three-dimensional color space, the number of expansions in the luminance direction is set greater than the number of expansions in the color tone direction.

10. The image processing apparatus according to claim 8, wherein, in a case where at least one of the color information about the object and the color information about the background is expanded in a luminance direction and a color tone direction in the three-dimensional color space, the number of expansions in the color tone direction is set greater than the number of expansions in the luminance direction.

11. The image processing apparatus according to claim 1, further comprising a distance acquisition unit configured to acquire information about a distance from the image capturing apparatus to the object,
   wherein, in a case where the information about the distance is within a prescribed range, the storage unit stores the respective pieces of the color information.

12. An image processing method, comprising:
   acquiring color information about an object and color information about a background in a first image captured by an image capturing apparatus;
   storing the acquired color information about the object and the acquired color information about the background in a storage unit;
   expanding, in a three-dimensional color space, the color information about the object and the color information about the background stored in the storage unit; and
   extracting an area of the object from a second image captured by the image capturing apparatus, based on the respective pieces of the expanded color information,
   wherein, in the expanding, in a case where at least one of the color information about the object and the color information about the background is expanded in a luminance direction and a color tone direction in the three-dimensional color space, the number of expansions in the luminance direction differs from the number of expansions in the color tone direction.

13. A non-transitory computer-readable storage medium storing a program for causing a computer to execute an image processing method, the method comprising:
   acquiring color information about an object and color information about a background in a first image captured by an image capturing apparatus;
   storing the acquired color information about the object and the acquired color information about the background in a storage unit;
   expanding, in a three-dimensional color space, the color information about the object and the color information about the background stored in the storage unit; and
   extracting an area of the object from a second image captured by the image capturing apparatus, based on the respective pieces of the expanded color information,
   wherein, in the expanding, in a case where at least one of the color information about the object and the color information about the background is expanded in a luminance direction and a color tone direction in the three-dimensional color space, the number of expansions in the luminance direction differs from the number of expansions in the color tone direction.

* * * * *